(12) United States Patent
Ha

(10) Patent No.: US 11,697,145 B2
(45) Date of Patent: Jul. 11, 2023

(54) JOINT FLANGE USING THICKNESS-INCREASED AND CUTTING-PROCESSED PIPE AND METHOD FOR MANUFACTURING SAME

(71) Applicant: Jin Sang Ha, Anyang-si (KR)

(72) Inventor: Jin Sang Ha, Anyang-si (KR)

( * ) Notice: Subject to any disclaimer, the term of this patent is extended or adjusted under 35 U.S.C. 154(b) by 935 days.

(21) Appl. No.: 16/338,541

(22) PCT Filed: Oct. 18, 2017

(86) PCT No.: PCT/KR2017/011525
§ 371 (c)(1),
(2) Date: Apr. 1, 2019

(87) PCT Pub. No.: WO2018/074836
PCT Pub. Date: Apr. 26, 2018

(65) Prior Publication Data
US 2019/0232355 A1 Aug. 1, 2019

(30) Foreign Application Priority Data

Oct. 18, 2016 (KR) .......................... 10-2016-0135340

(51) Int. Cl.
*B21D 28/32* (2006.01)
*B21D 28/34* (2006.01)
(Continued)

(52) U.S. Cl.
CPC ........... *B21D 28/32* (2013.01); *B21D 19/046* (2013.01); *B21D 28/34* (2013.01); *B21D 39/046* (2013.01);
(Continued)

(58) Field of Classification Search
CPC ...... B21D 19/046; B21D 19/02; B21C 37/16; B21C 37/156
(Continued)

(56) References Cited

U.S. PATENT DOCUMENTS

| 6,328,351 B1 * | 12/2001 | Kato ....................... F28F 9/262 |
| | | 285/368 |
| 6,908,117 B1 * | 6/2005 | Pickett, Jr. ............ F16L 41/086 |
| | | 285/137.11 |

(Continued)

FOREIGN PATENT DOCUMENTS

| CN | 1139026 A | 1/1997 |
| CN | 1478620 A | 3/2004 |

(Continued)

OTHER PUBLICATIONS

PCT International Search Report corresponding to PCT/KR2017/011525.

*Primary Examiner* — Shelley M Self
*Assistant Examiner* — Smith Oberto Bapthelus
(74) *Attorney, Agent, or Firm* — Schmeiser, Olsen & Watts, LLP

(57) ABSTRACT

A method of manufacturing a joint flange using a thickness-increased, machined pipe is provided. The method includes a pipe cutting operation in which a pipe is cut to a predetermined length, a flange forming operation in which a flange having a mounting hole for installing the pipe is formed by die casting, a bump-forming operation in which a thickness-increased part, which is formed by increasing a thickness of one end of the pipe, is bumped to form a first bead locked to the flange, a machining operation in which a circumference of the thickness-increased part is machined to form a sealing groove having an O-ring installed, and a fixing operation in which the pipe is inserted in the mounting hole of the flange and the other end of the pipe is pressed to form a second bead so that the pipe is pressed to a lower end of the flange.

3 Claims, 7 Drawing Sheets

(51) Int. Cl.
  *B21D 19/04* (2006.01)
  *B21D 39/04* (2006.01)
  *B22D 17/22* (2006.01)
  *F16L 23/032* (2006.01)
  *F16L 23/18* (2006.01)
  *F16L 23/024* (2006.01)
  *F16L 23/028* (2006.01)
  *B22D 17/00* (2006.01)
  *F16L 23/16* (2006.01)
  *F16L 39/00* (2006.01)
  *F16L 23/02* (2006.01)

(52) U.S. Cl.
  CPC ............ *B22D 17/00* (2013.01); *B22D 17/22* (2013.01); *B22D 17/2263* (2013.01); *F16L 23/024* (2013.01); *F16L 23/0283* (2013.01); *F16L 23/032* (2013.01); *F16L 23/16* (2013.01); *F16L 23/18* (2013.01); *F16L 23/02* (2013.01); *F16L 39/00* (2013.01)

(58) Field of Classification Search
  USPC ............ 29/527.5; 72/370.1, 307.11, 370.14, 72/370.15
  See application file for complete search history.

(56) References Cited

U.S. PATENT DOCUMENTS

| | | |
|---|---|---|
| 2004/0036277 A1 | 2/2004 | Inaba et al. |
| 2009/0145152 A1* | 6/2009 | Yoshino .................. F25B 41/40 29/890.053 |

FOREIGN PATENT DOCUMENTS

| | | |
|---|---|---|
| CN | 1516794 A | 7/2004 |
| CN | 1815134 A | 8/2006 |
| CN | 103574195 A | 2/2014 |
| CN | 203572302 U | 4/2014 |
| CN | 104081103 A | 10/2014 |
| FR | 2792704 A1 | 10/2000 |
| GB | 2299776 * | 10/1996 |
| JP | H08261378 * | 10/1996 |
| JP | H08261378 A | 10/1996 |
| JP | H1113960 A | 1/1999 |
| KR | 20040004097 A | 1/2004 |
| KR | 20-0365026 | 10/2004 |
| KR | 200365026 Y1 | 10/2004 |
| KR | 20100102477 A | 9/2010 |
| KR | 101060614 B1 | 8/2011 |
| KR | 20120059028 A | 6/2012 |
| KR | 20120088362 A | 8/2012 |
| KR | 101499344 B1 | 3/2015 |

* cited by examiner

FIG. 3A
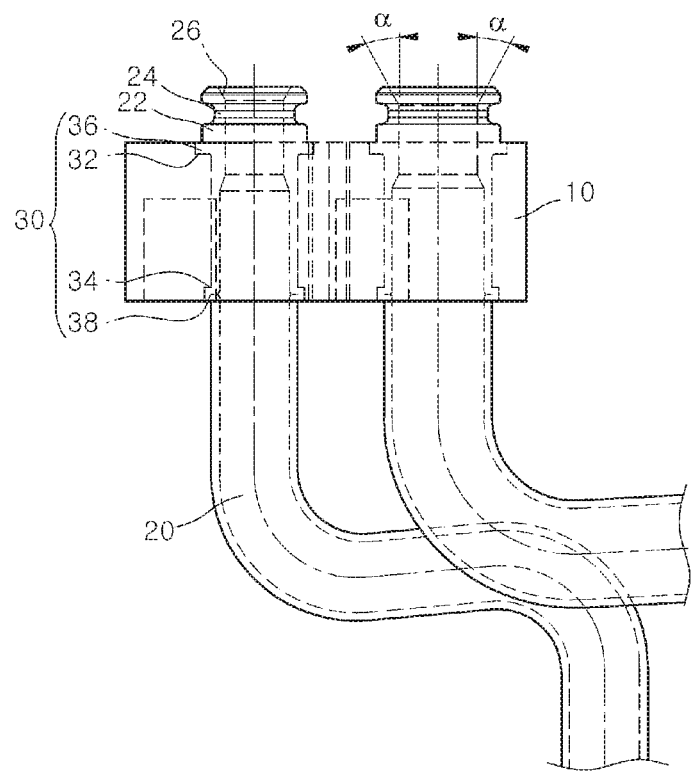
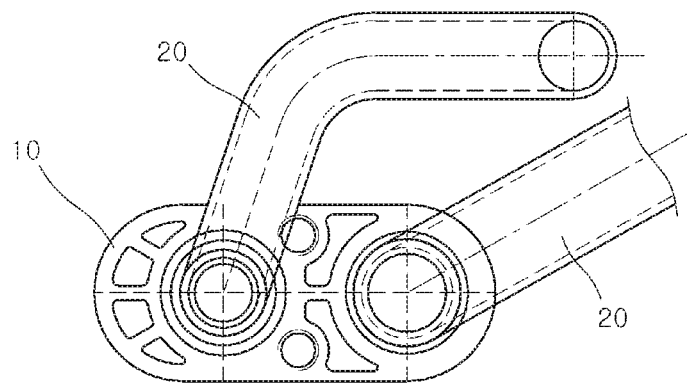
FIG. 3B

JOINT FLANGE USING THICKNESS-INCREASED AND CUTTING-PROCESSED PIPE AND METHOD FOR MANUFACTURING SAME

CROSS-REFERENCE TO RELATED APPLICATIONS

This application claims priority to PCT Application No. PCT/KR2017/011525, having a filing date of Oct. 18, 2017, based on KR 10-2016-0135340, having a filing date of Oct. 18, 2016, the entire contents both of which are hereby incorporated by reference.

FIELD OF TECHNOLOGY

The following relates to a joint flange using a thickness-increased and machined pipe and a manufacturing method thereof, and more particularly, to a joint flange using a thickness-increased and machined pipe and a manufacturing method thereof capable of decreasing the production time of the joint flange and reducing the production cost thereof by increasing a thickness of one end of a pipe toward the inside and outside by compressing the one end, machining a locking bead and a sealing part on a circumferential portion of the pipe using universal equipment, and then pressing and fixing the pipe to a flange which is manufactured by die casting.

BACKGROUND

Generally, a cooling system of a vehicle is formed of a compressor, a condenser, an expansion valve, an evaporator, and the like, and the components are connected to each other by pipes filled with a refrigerant. In this case, to increase a coupling force of pipe connection while improving efficiency of a piping task, a joint flange for fixing the pipe by inserting the pipe into a coupling hole has been used. The joint flange is not only applied to the vehicle cooling system but may also be applied to various other devices such as a device for connecting and fixing pipes configured to convey a fluid.

In a conventional process for assembling a joint flange in which a pipe and a flange are coupled, generally, a joint flange is manufactured through operations in which the flange is manufactured using a forging or extrusion process, the flange is cut to an appropriate length, the flange is processed to form a sealing part, and a pipe is inserted into a hole formed in one side of the flange and then fixed by welding.

However, the conventional method of assembling a pipe and a flange has problems in that the sealing part is machined in a process of processing an extruded product of a joint flange, a large amount of assembly work is required for a process of fixing the pipe by welding, and the manufacturing cost is increased.

Therefore, there is a need to address such problems.

The known art has been proposed in Korean Unexamined Patent Application Publication No. 10-2012-0088362 (Aug. 8, 2012, Joint flange for vehicle).

SUMMARY

An aspect relates to a joint flange using a thickness-increased and machined pipe and a manufacturing method thereof capable of decreasing the production time of the joint flange and reducing the production cost thereof by increasing a thickness of one end of a pipe toward the inside and outside by compressing the one end, machining a locking bead and a sealing part on a circumferential portion of the pipe using universal equipment, and then pressing and fixing the pipe to a flange which is manufactured by die casting.

To achieve the above-described aspect, a joint flange using a thickness-increased and machined pipe according to embodiments of the present invention includes a flange having one or more mounting holes and a fastening hole for coupling formed therein, a pipe installed in the mounting hole and configured to convey a fluid including a refrigerant, and a coupling part provided at the pipe and the flange and configured to fix the pipe to the flange, wherein the pipe includes a thickness-increased part in which a thickness of an upper portion is increased by bump-forming so that the pipe is fitted into the mounting hole, and a sealing groove having an O-ring installed is formed by machining a circumference of the thickness-increased part.

In addition, the coupling part may include a first installation groove recessed in an upper edge of the mounting hole of the flange, a second installation groove recessed in a lower edge of the mounting hole of the flange, a first bead formed by machining a lower circumference of the thickness-increased part, and a second bead configured to, in a state in which the pipe is inserted into the mounting hole and the first bead is locked to the first installation groove, press a lower end of the pipe and cause the lower end of the pipe to be adhered to the second installation groove so that the pipe is fixed to the flange.

In addition, the thickness-increased part may be formed such that an inner diameter and an outer diameter thereof are widened by reducing a top length of the pipe, and an inclined installation surface whose inner diameter gradually increases outward may be formed at an upper inner circumferential surface of the thickness-increased part.

In addition, in the pipe, the thickness-increased part and the first bead may be formed through a plurality of bumping processes using a forming member.

In addition, the forming member may include a first punch member having a first entrance groove formed therein configured to accommodate an upper portion of the pipe, including a first expansion groove to increase the outer diameter of the thickness-increased part outward, and having a bead processing groove configured to form the first bead, a second punch member having a second entrance groove formed therein configured to accommodate the upper portion of the pipe processed by the first punch member and including a second expansion groove to increase the inner diameter of the thickness-increased part inward, and a third punch member having a third entrance groove formed therein configured to accommodate the upper portion of the pipe processed by the second punch member and including a third expansion groove to further increase the inner diameter of the thickness-increased part inward.

To achieve the above-described aspect, a method of manufacturing a joint flange using a thickness-increased and machined pipe according to embodiments of the present invention includes a pipe cutting operation in which a pipe is prepared and cut to a predetermined length, a flange forming operation in which a flange having a mounting hole for installing the pipe is formed by die casting, a bump-forming operation in which a thickness-increased part, which is formed by increasing a thickness of one end of the pipe, is bumped to form a first bead locked to the flange, a machining operation in which a circumference of the thickness-increased part is machined to form a sealing groove in which an O-ring is installed, and a fixing operation in which the pipe is inserted and installed in the mounting hole of the flange and the other end of the pipe is pressed to form a second bead so that the pipe is pressed and fixed to a lower end of the flange.

In addition, the bump-forming operation may include a first bump-forming operation in which one end of the pipe is accommodated using a first punch member, which has a first entrance groove, a first expansion groove, and a bead processing groove formed therein, and an outer diameter of the pipe is increased outward to form the thickness-increased part and form the first bead, a second bump-forming operation in which, after the first bump-forming operation, the one end of the pipe is accommodated using a second punch member, which has a second entrance groove and a second expansion groove formed therein, and an inner diameter of the thickness-increased part is increased inward, and a third bump-forming operation in which, after the second bump-forming operation, the one end of the pipe is accommodated using a third punch member, which has a third entrance groove and a third expansion groove formed therein, and the inner diameter of the thickness-increased part is further increased inward.

In addition, a first installation groove in which the first bead is seated and installed and a second installation groove in which the second bead is seated and installed may be formed in the flange, and the thickness of the thickness-increased part may become thicker as a length of the one end of the pipe gradually becomes shorter toward the first punch member, the second punch member, and the third punch member.

In addition, an inclined installation surface whose inner diameter gradually increases outward toward an end may be formed at an upper inner circumferential surface of the thickness-increased part, and any one angle of inclination of the inclined installation surface with respect to a vertical line may be in a range of 25° to 35°.

By a joint flange using a thickness-increased and machined pipe and a manufacturing method thereof according to embodiments of the present invention, the production time of the joint flange can be decreased, and the production cost thereof can be reduced by increasing a thickness of one end of a pipe toward the inside and outside by compressing the one end, machining a locking bead and a sealing part on a circumferential portion of the pipe using universal equipment, and then pressing and fixing the pipe to a flange which is manufactured by die casting.

BRIEF DESCRIPTION

Some of the embodiments will be described in detail, with reference to the following figures, wherein like designations denote like members, wherein:

FIG. 3a is a front view of an assembly state of the joint flange using the thickness-increased and machined pipe according to embodiments of the present invention.

FIG. 3b is a plan view of an assembly state of the joint flange using the thickness-increased and machined pipe according to embodiments of the present invention.

DETAILED DESCRIPTION

Figure 1:
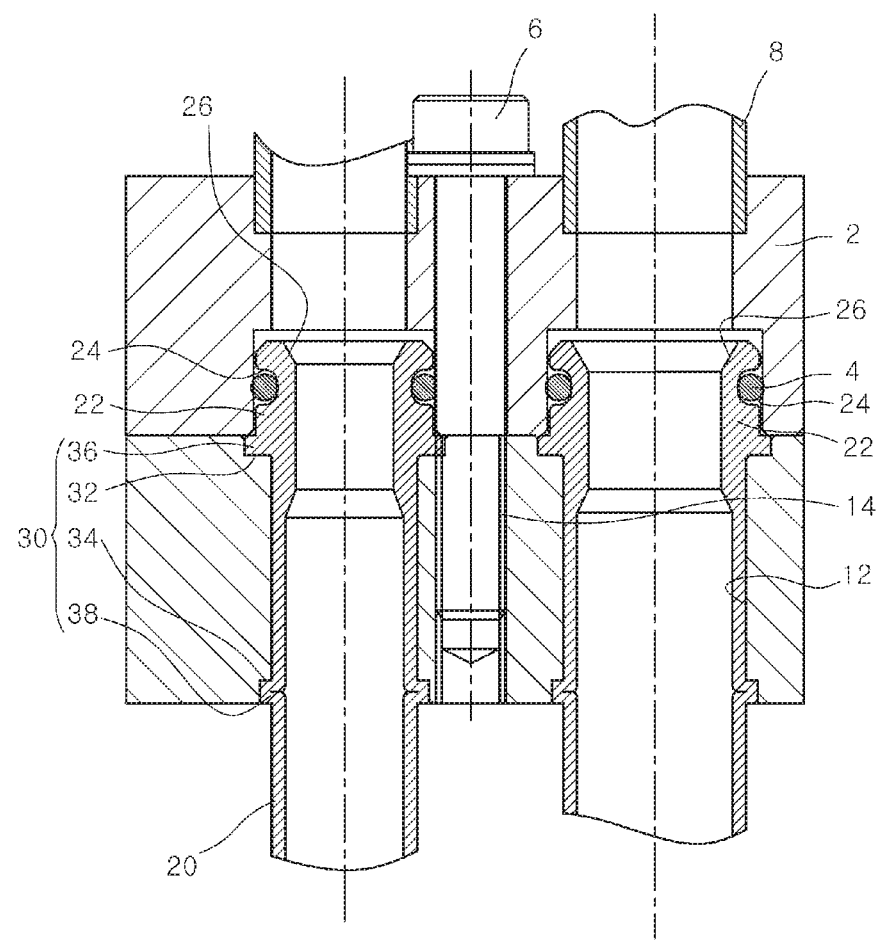
FIG. 1 is a cross-sectional view of a state in which a joint flange using a thickness-increased and machined pipe according to embodiments of the present invention is assembled to a target flange.

Hereinafter, a joint flange using a thickness-increased and machined pipe and a manufacturing method thereof according to embodiments of the present invention will be described with reference to the accompanying drawings.

In this process, thicknesses of lines, sizes of elements, or the like illustrated in the drawings may have been exaggerated for clarity and convenience of description. Terms which will be described below are terms defined in consideration of functions in embodiments of the present invention and may vary according to intensions or practices of a user or an operator. Therefore, such terms should be defined on the basis of content throughout the present specification.

Figure 2:
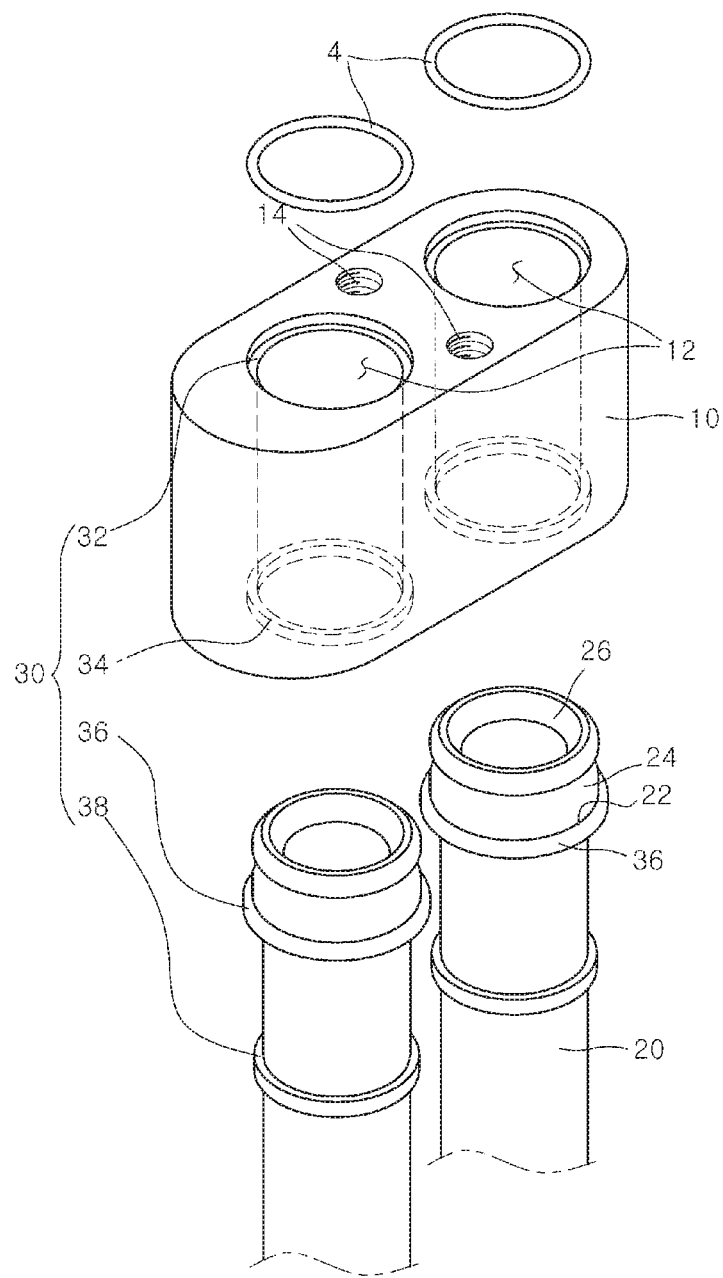
FIG. 2 is an exploded perspective view of the joint flange using the thickness-increased and machined pipe according to embodiments of the present invention.
Figure 4:
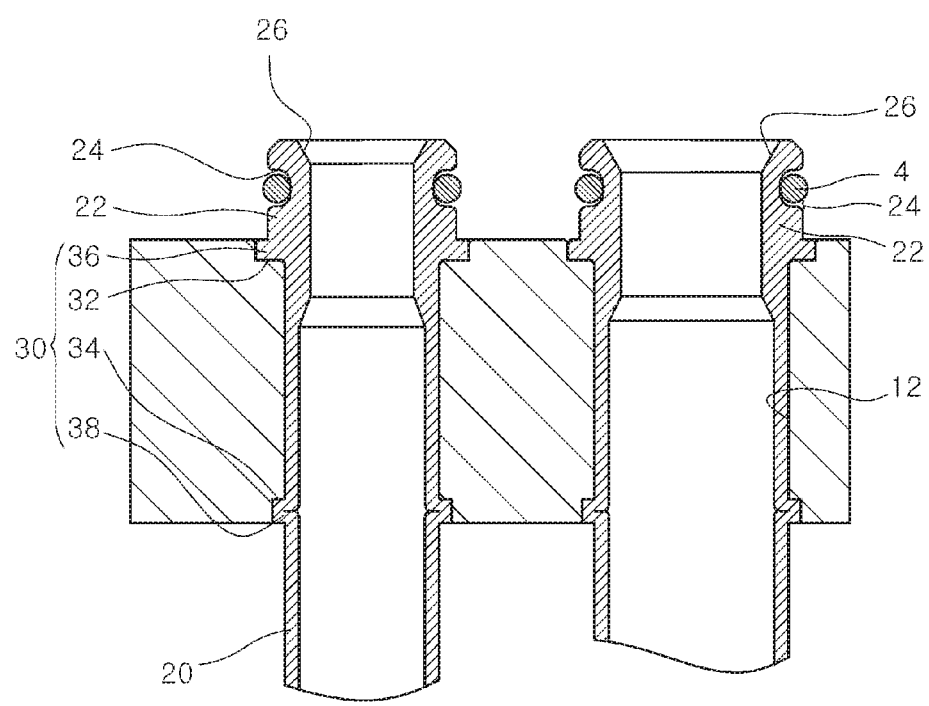
FIG. 4 is a cross-sectional view of an assembly of the joint flange using the thickness-increased and machined pipe according to embodiments of the present invention.
Figure 5:
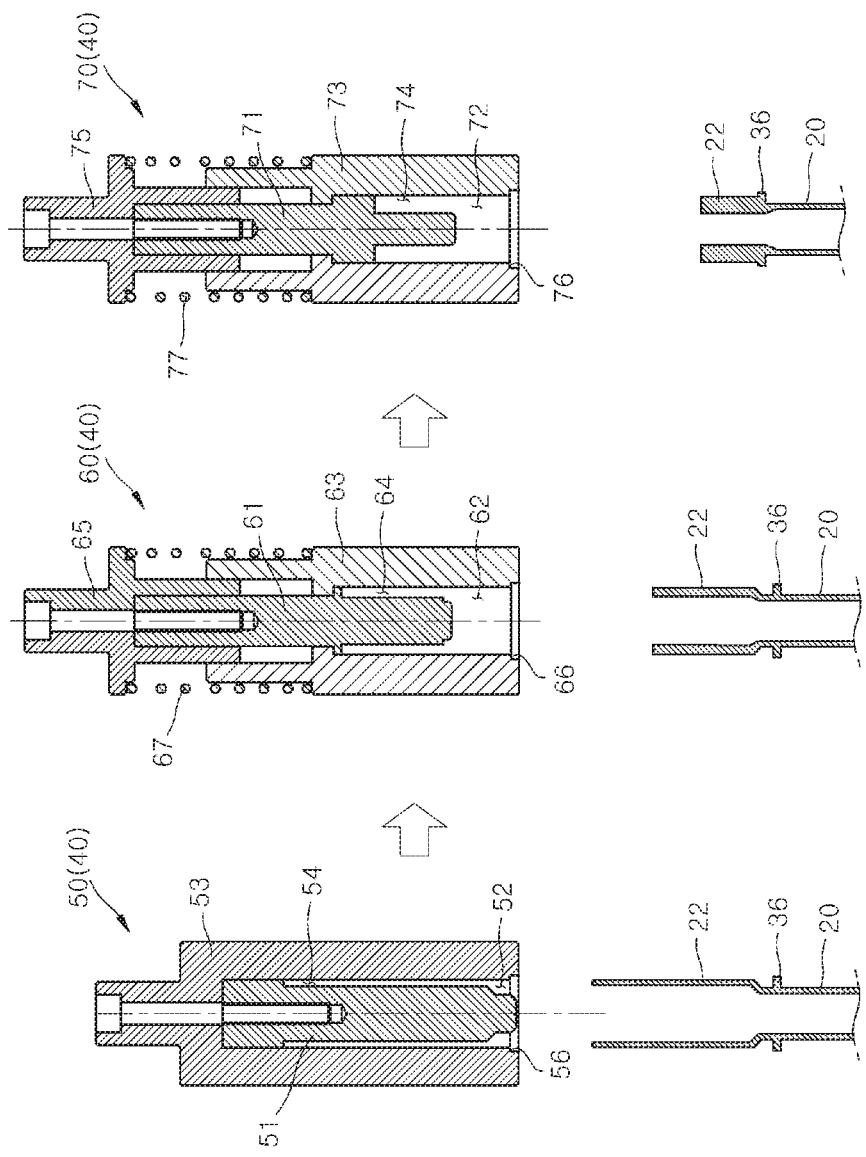
FIG. 5 illustrates a process of forming a thickness-increased part and a first bead in the thickness-increased and machined pipe according to embodiments of the present invention by using a forming member.
Figure 6:
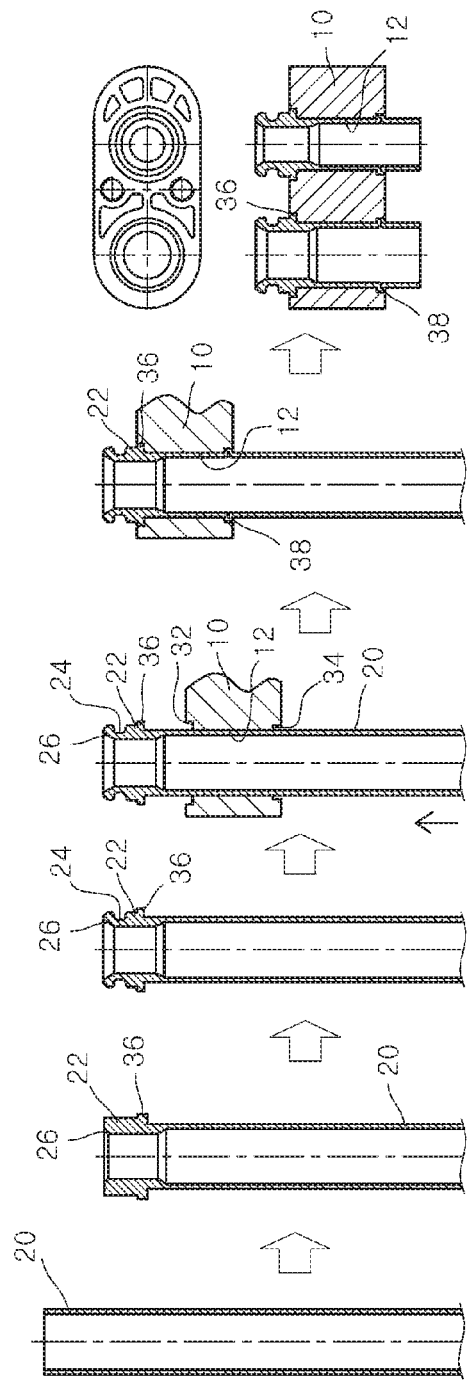
FIG. 6 illustrates an operation of manufacturing the joint flange using the thickness-increased and machined pipe according to embodiments of the present invention.
Figure 7:
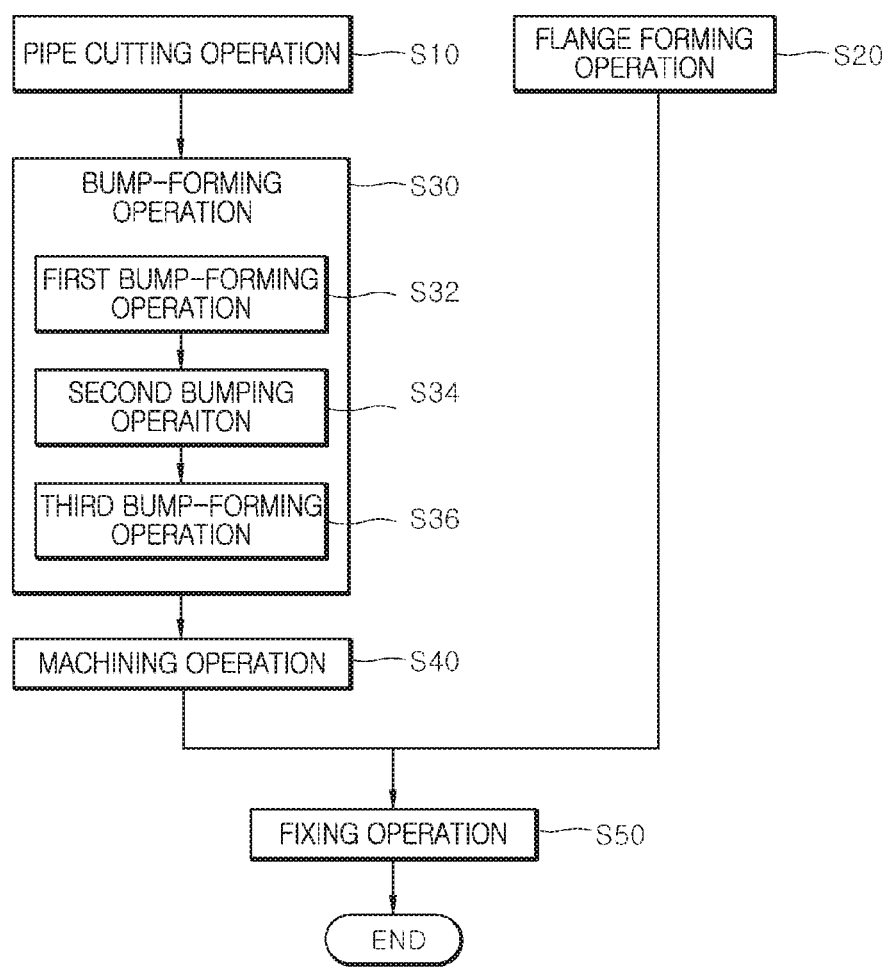
FIG. 7 is a flowchart showing a method of manufacturing the joint flange using the thickness-increased and machined pipe according to embodiments of the present invention.

FIG. 1 is a cross-sectional view of a state in which a joint flange using a thickness-increased and machined pipe according to embodiments of the present invention is assembled to a target flange; FIG. 2 is an exploded perspective view of the joint flange using the thickness-increased and machined pipe according to embodiments of the present invention; FIG. 3b is a plan view and FIG. 3a is a front view of an assembly state of the joint flange using the thickness-increased and machined pipe according to embodiments of the present invention; FIG. 4 is a cross-sectional view of an assembly of the joint flange using the thickness-increased and machined pipe according to embodiments of the present invention; FIG. 5 illustrates a process of forming a thickness-increased part and a first bead in the thickness-increased and machined pipe according to embodiments of the present invention by using a forming member; FIG. 6 illustrates an operation of manufacturing the joint flange using the thickness-increased and machined pipe according to embodiments of the present invention; and FIG. 7 is a flowchart showing a method of manufacturing the joint flange using the thickness-increased and machined pipe according to embodiments of the present invention.

Referring to FIGS. 1 to 7, a joint flange 100 using a thickness-increased and machined pipe according to embodiments of the present invention includes a flange 10, a pipe 20, and a coupling part 30.

The flange 10 is a configuration in which one or more mounting holes 12 are formed and a fastening hole 14 for coupling is formed.

The flange 10 is formed by a die casting molding process.

The joint flange 100 is inserted and installed in a hole of a target flange 2 in a state in which an O-ring 4 is mounted in a sealing groove 24 of the pipe 20 installed in the mounting hole 12 of the flange 10, and the joint flange 100 passes through the target flange 2 via a fastening member 6 so as to be fastened to the fastening hole 14 of the flange 10. In this way, the joint flange 100 and the target flange 2 are assembled to each other, and the pipe 20 and a connecting pipe 8 are connected to each other such that a fluid such as a refrigerant is conveyed therethrough.

The mounting hole 12 is a configuration one or more of which is formed in the flange 10 and into which the pipe 20 is inserted and installed. In the accompanying drawings, it is illustrated that two mounting holes 12 are formed, and two fastening holes 14 are formed between the mounting holes 12. Description will be given on the basis of the drawings.

The pipe 20 is a configuration installed in the mounting hole 12 and configured to convey a fluid including a refrigerant. The pipe 20 may be a refrigerant pipe for mainly conveying a refrigerant.

An aluminum pipe or a copper pipe may be used as the pipe 20.

The coupling part 30 is a configuration provided in the pipe 20 and the flange 10 and configured to fix the pipe 20 to the flange 10.

The coupling part 30 increases both sides of the pipe 20 and fixes the both sides of the pipe 20 to both sides of the flange 10, thereby firmly fixing the pipe 20 to the flange 10.

The pipe 20 includes a thickness-increased part 22 in which a thickness of an upper portion is increased by bump-forming so that the pipe 20 is fitted into the mounting hole 12.

The sealing groove 24 having the O-ring 4 installed may be formed by machining a circumference of the thickness-increased part 22.

The coupling part 30 includes a first installation groove 32 recessed in an upper edge of the mounting hole 12 of the flange 10, a second installation groove 34 recessed in a lower edge of the mounting hole 12 of the flange 10, a first bead 36 formed by machining a lower circumference of the thickness-increased part 22, and a second bead 38 configured to, in a state in which the pipe 20 is inserted into the mounting hole 12 and the first bead 36 is locked to the first installation groove 32, press a lower end of the pipe 20 and cause the lower end of the pipe 20 to be adhered to the second installation groove 34 so that the pipe 20 is fixed to the flange 10.

The first bead 36 is formed to have a cross-section of various shapes such as elliptical or quadrangular and is locked and mounted to the first installation groove 32.

The thickness-increased part 22 is formed such that an inner diameter and an outer diameter thereof are widened inward and outward, respectively, by reducing a top length of the pipe 20.

An inclined installation surface 26 whose inner diameter gradually increases outward may be formed at an upper inner circumferential surface of the thickness-increased part 22. It is desirable that any one angle of inclination a of the inclined installation surface 26 with respect to a vertical line be formed in a range of 25° to 35°. 30° is most appropriate as the angle of inclination a of the inclined installation surface 26.

In the pipe 20, the thickness-increased part 22 and the first bead 36 are formed through a plurality of bumping processes using a forming member 40.

The forming member 40 may include a first punch member 50 forming a first entrance groove 52 configured to accommodate an upper portion of the pipe 20, including a first expansion groove 54 to increase the outer diameter of the thickness-increased part 22 outward, and having a bead processing groove 56 configured to form the first bead 36, a second punch member 60 forming a second entrance groove 62 configured to accommodate the upper portion of the pipe 20 processed by the first punch member 50 and including a second expansion groove 64 to increase the inner diameter of the thickness-increased part 22 inward, and a third punch member 70 forming a third entrance groove 72 configured to accommodate the upper portion of the pipe 20 processed by the second punch member 60 and including a third expansion groove 74 to further increase the inner diameter of the thickness-increased part 22 inward.

In the second punch member 60, a bead processing groove 66 is formed at a position corresponding to that of the bead processing groove 56. In the third punch member 70, a bead processing groove 76 is formed at a position corresponding to those of the bead processing grooves 56 and 66.

The first punch member 50 is formed of two components, a first inner punch part 51 configured to support an inner diameter of one end of the pipe 20 and a first outer punch part 53 configured to be fixed and coupled to an outer side of the first inner punch part 51 via a bolt member.

Because an outer diameter of the first inner punch part 51 is formed to be larger than the inner diameter of the pipe 20, as the pipe 20 enters the first inner punch part 51, the pipe 20 increases, and the outer diameter of the pipe 20 further increases outward.

The second punch member 60 is formed of four components, a second inner punch part 61 configured to support the inner diameter of the one end of the pipe 20, a second outer punch part 63 disposed outside the second inner punch part 61 and configured to guide sliding of the second inner punch part 61, a first connecting punch part 65 configured to be coupled to the second inner punch part 61 via a bolt member so as to push the second inner punch part 61, and a first elastic member 67 disposed between the first connecting punch part 65 and the second outer punch part 63 to provide an elastic restoration force to the first connecting punch part 65.

Because the first elastic member 67 provides an elastic restoration force to the rear in a state in which the second inner punch part 61 is adhered to the inner diameter of the one end of the pipe 20, the first elastic member 67 pushes the first connecting punch part 65 at the one end of the pipe 20 and facilitates deviation of the second inner punch part 61.

The third punch member 70 is formed of four components, a third inner punch part 71 configured to support the inner diameter of the one end of the pipe 20, a third outer punch part 73 disposed outside the third inner punch part 71 and configured to guide sliding of the third inner punch part 71, a second connecting punch part 75 configured to be coupled to the third inner punch part 71 via a bolt member so as to push the third inner punch part 71, and a second elastic member 77 disposed between the second connecting punch part 75 and the third outer punch part 73 to provide an elastic restoration force to the second connecting punch part 75.

Because the second elastic member 77 provides an elastic restoration force to the rear in a state in which the third inner punch part 71 is adhered to the inner diameter of the one end of the pipe 20, the second elastic member 77 pushes the second connecting punch part 75 at the one end of the pipe 20 and facilitates deviation of the third inner punch part 71.

The first and second elastic members 67 and 77 may be coil springs.

The length of the one end of the pipe 20 becomes shorter and the thickness thereof is gradually increased toward the first expansion groove 54, the second expansion groove 64, and the third expansion groove 74. That is, as the length of the one end of the pipe 20 becomes gradually shorter due to the forming member 40, and thus the volume corresponding to the shortened length is converted to thickness, the thickness of the thickness-increased part 22 is increased.

Hereinafter, a method of manufacturing a joint flange using a thickness-increased and machined pipe according to embodiments of the present invention will be described with reference to the accompanying drawings.

A method of manufacturing a joint flange 100 using a thickness-increased and machined pipe 20 according to embodiments of the present invention includes a pipe cutting operation S10, a flange forming operation S20, a bump-forming operation S30, a machining operation S40, and a fixing operation S50.

The pipe cutting operation 10 is a cutting operation in which the pipe 20 is prepared and cut to a predetermined length.

The flange forming operation S20 is an operation in which a flange 10 having a mounting hole 12 for installing the pipe 20 is formed by die casting.

The bump-forming operation S30 is an operation in which a thickness-increased part 22, which is formed by increasing a thickness of one end of the pipe 20, is bumped to form a first bead 36 locked to the flange 10.

The machining operation S40 is an operation in which a circumference of the thickness-increased part 22 is machined to form a sealing groove 24 having an O-ring 4 installed.

The fixing operation S50 is an operation in which the pipe 20 is inserted and installed in the mounting hole 12 of the flange 10, and the other end of the pipe 20 is pressed to form a second bead 38 so that the pipe 20 is pressed and fixed to a lower end of the flange 10.

That is, by adhering and fixing the second bead 38, which is formed by pressing the other end of the pipe 20, to a second installation groove 34 in a state in which the first bead 36 of the pipe 20 is locked to an first installation groove 32 of the flange 10, it is possible to firmly fix the pipe 20 to the flange 10.

The bump-forming operation S30 includes a first bump-forming operation S32, a second bump-forming operation S34, and a third bump-forming operation S36.

The first bump-forming operation S32 is an operation in which one end of the pipe 20 is accommodated using a first punch member 50, which has a first entrance groove 52, a first expansion groove 54, and a bead processing groove 56 formed therein, and an outer diameter of the pipe 20 is increased outward to form the thickness-increased part 22 and form the first bead 36.

The second bump-forming operation S34 is an operation in which, after the first bump-forming operation S32, the one end of the pipe 20 is accommodated using a second punch member 60, which has a second entrance groove 62 and a second expansion groove 64 formed therein, and an inner diameter of the thickness-increased part 22 is increased inward.

In the second punch member 60, a bead processing groove 66 is formed at a position corresponding to that of the bead processing groove 56.

The third bump-forming operation S36 is an operation in which, after the second bump-forming operation S34, the one end of the pipe 20 is accommodated using a third punch member 70, which has a third entrance groove 72 and a third expansion groove 74 formed therein, and the inner diameter of the thickness-increased part 22 is further increased inward.

In the third punch member 70, a bead processing groove 76 is formed at a position corresponding to those of the bead processing grooves 56 and 66. A first installation groove 32 in which the first bead 36 is seated and installed and a second installation groove 34 in which the second bead 38 is seated and installed are formed in the flange 10.

As the length of the one end of the pipe 20 gradually becomes shorter toward the first punch member 50, the second punch member 60, and the third punch member 70, the outer diameter of the thickness-increased part 22 is increased, and the inner diameter thereof is narrowed. In this way, the overall thickness of the thickness-increased part 22 becomes thicker.

An inclined installation surface 26 whose inner diameter gradually increases outward toward an end may be formed at an upper inner circumferential surface of the thickness-increased part 22. Any one angle of inclination a of the inclined installation surface 26 with respect to a vertical line may be in a range of 25° to 35°. 30° is the optimal angle of inclination a of the inclined installation surface 26.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A method of manufacturing a joint flange using a thickness-increased and machined pipe, the method comprising:

preparing and cutting a pipe to a predetermined length;

forming a flange having a mounting hole by die casting, the flange used for installing the pipe;

forming a thickness-increased part using a plurality of bumping operations, wherein:

a first bumping operation uses a first punch member having a first entrance groove formed therein configured to accommodate an upper portion of the pipe, including a first expansion groove to increase a thickness of the thickness-increased part outward, and having a bead processing groove configured to form the first bead, a second bumping operation uses a second punch member having a second entrance groove formed therein configured to accommodate the upper portion of the pipe processed by the first punch member and including a second expansion groove to increase the thickness of the thickness-increased part inward, the second expansion groove having a greater width than the first expansion groove, and a third bumping operation uses a third punch member having a third entrance groove formed therein configured to accommodate the upper portion of the pipe processed by the second punch member and including a third expansion groove to further increase the thickness of the thickness-increased part inward, the third expansion groove having a width greater than the width of the second expansion groove, as a result of the plurality of bumping operations, an inner diameter of the pipe is decreased at the one end of the pipe, and the first bead locked to the flange is formed;

machining a circumference of the thickness-increased part to form a sealing groove having an O-ring installed; and inserting and installing the pipe in the mounting hole of the flange and the other end of the pipe is pressed to form a second bead so that the pipe is pressed and fixed to a lower end of the flange.

2. The method of claim 1, wherein:
a first installation groove in which the first bead is seated and installed and a second installation groove in which the second bead is seated and installed are formed in the flange; and
the thickness of the thickness-increased part becomes thicker as a length of the one end of the pipe gradually becomes shorter toward the first punch member, the second punch member, and the third punch member.

3. The method of claim 1, wherein:
an inclined installation surface whose inner diameter gradually increases outward toward an end is formed at an upper inner circumferential surface of the thickness-increased part; and
an angle of inclination of the inclined installation surface with respect to a vertical line is in a range of 25° to 35°.

* * * * *